(12) United States Patent
Koike et al.

(10) Patent No.: US 11,367,031 B2
(45) Date of Patent: Jun. 21, 2022

(54) DELIVERY PLAN CREATING DEICE AND DELIVERY PLAN CREATING METHOD

(71) Applicant: HITACHI, LTD., Tokyo (JP)

(72) Inventors: Futoshi Koike, Tokyo (JP); Junko Hosoda, Tokyo (JP); Naoko Kishikawa, Tokyo (JP); Akane Seto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/952,592

(22) Filed: Nov. 19, 2020

(65) Prior Publication Data

US 2021/0264338 A1 Aug. 26, 2021

(30) Foreign Application Priority Data

Feb. 21, 2020 (JP) .............................. JP2020-027926

(51) Int. Cl.
G06Q 10/06 (2012.01)
G06Q 10/08 (2012.01)
G06Q 10/10 (2012.01)

(52) U.S. Cl.
CPC . G06Q 10/06312 (2013.01); G06Q 10/06313 (2013.01); G06Q 10/063114 (2013.01); G06Q 10/0833 (2013.01); G06Q 10/109 (2013.01)

(58) Field of Classification Search
CPC ..... G06Q 10/06312; G06Q 10/063114; G06Q 10/06313; G06Q 10/0833; G06Q 10/109
See application file for complete search history.

(56) References Cited

U.S. PATENT DOCUMENTS 6,578,005 B1 * 6/2003 Lesaint .................. G06Q 10/06
705/7.14
2011/0208556 A1 * 8/2011 Nagahara ....... G06Q 10/063112
705/7.14

(Continued)

FOREIGN PATENT DOCUMENTS

JP         4210666 B2 *   1/2009
JP      2015-201006 A    11/2015

(Continued)

OTHER PUBLICATIONS

Ulmer, Marlin. "Delivery deadlines in same-day delivery." Logistics Research 10.3 (2017): 1-15. (Year: 2017).*

(Continued)

*Primary Examiner* — Patricia H Munson
*Assistant Examiner* — Hamzeh Obaid
(74) *Attorney, Agent, or Firm* — Volpe Koenig

(57) ABSTRACT

A delivery plan creating device includes: a delivery request acquisition unit that acquires a delivery change request; a change instruction deadline calculation unit that calculates, based on a delivery time range contained in the delivery change request, a change instruction deadline representing a deadline that can instruct a change in a delivery plan; a storage unit that stores conditional calculation record information in which a delivery condition set at a time of creating an executed delivery plan is in association with calculation time required for creating the executed delivery plan; a search unit that selects a delivery condition set similar to the delivery change request from the conditional calculation record information; and a calculation starting time point calculation unit that calculates a calculation starting time point by counting the calculation time in association with the selected delivery condition set backward from the change instruction deadline.

9 Claims, 14 Drawing Sheets

(56) References Cited

U.S. PATENT DOCUMENTS

| | | | | |
|---|---|---|---|---|
| 2012/0278204 A1* | 11/2012 | Urano | ............. | G06Q 10/08 |
| | | | | 705/28 |
| 2014/0149164 A1* | 5/2014 | Yumbe | ......... | G06Q 10/0631 |
| | | | | 705/7.15 |
| 2018/0300683 A1* | 10/2018 | Koike | ............ | G01C 21/3453 |
| 2020/0327466 A1* | 10/2020 | Noda | ............. | G05B 19/042 |

FOREIGN PATENT DOCUMENTS

| | | | |
|---|---|---|---|
| JP | 2018-092255 A | 6/2018 | |
| WO | WO-2015178092 A1 * | 11/2015 | ............ G06Q 50/30 |

OTHER PUBLICATIONS

Lu, Shan. "Supply chain-oriented multi-stage ATP study." 2008 International Conference on Intelligent Computation Technology and Automation (ICICTA). vol. 2. IEEE, 2008. (Year: 2008).*

* cited by examiner

[FIG. 1]
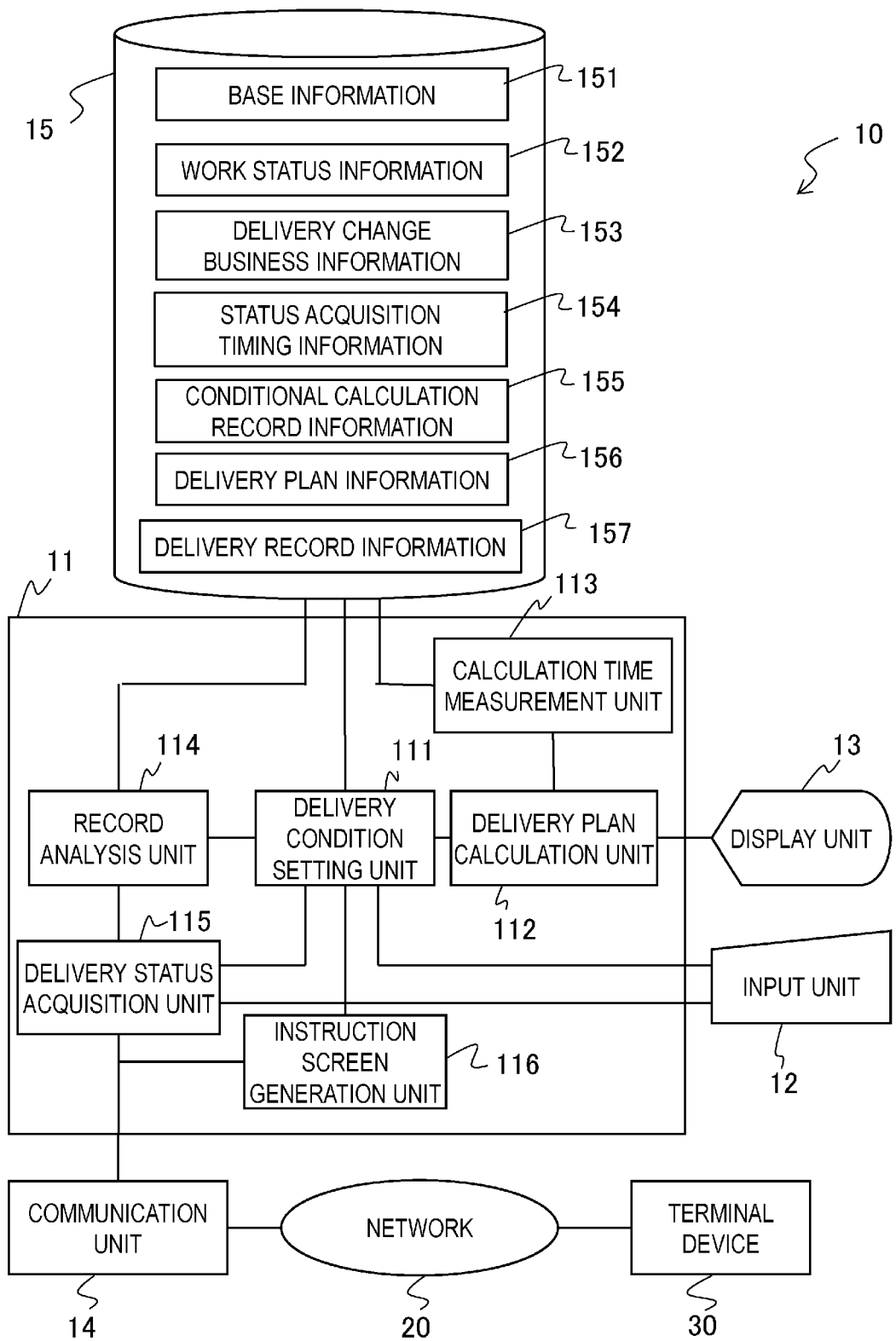

[FIG. 2]
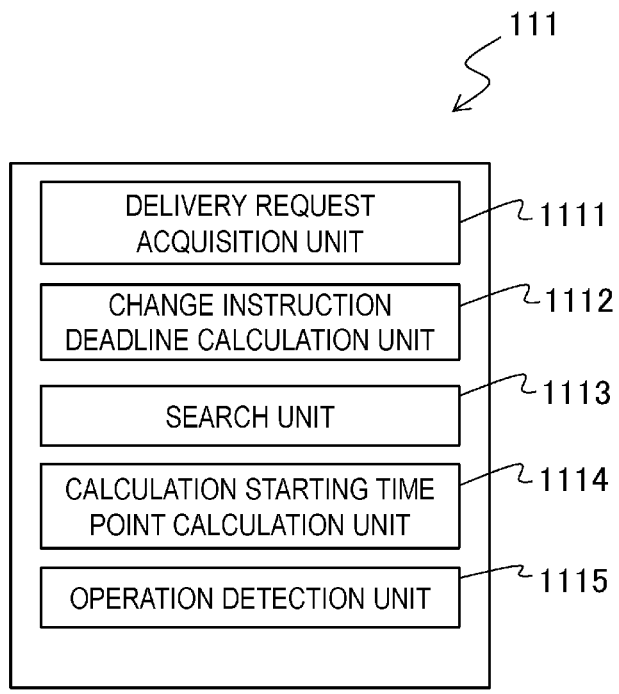
[FIG. 3]
| BASE ID | LATITUDE | LONGITUDE | ALTITUDE | COMMERCIAL FACILITY | TRANSPORTATION METHOD |
|---|---|---|---|---|---|
| b001 | 34.800458 | 135.498357 | 40 | Yes | ON FOOT/ ELEVATOR |
| b002 | 34.765305 | 135.545542 | 25 | No | ON FOOT |
| b003 | 34.8267828 | 135.4120883 | 35 | Yes | ON FOOT |
| b004 | 34.793991 | 135.509801 | 22 | No | ON FOOT |
| ⋮ | ⋮ | ⋮ | ⋮ | ⋮ | ⋮ |

[FIG. 4]
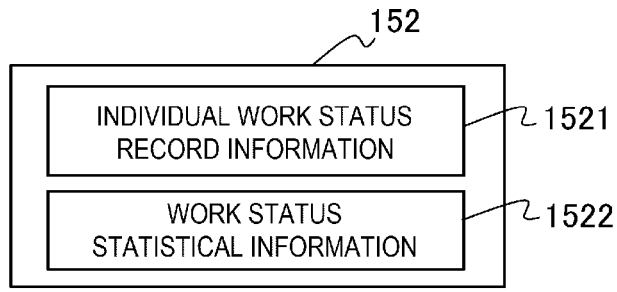
[FIG. 5]
|STATUS ID|DATE|BASE ID|LOADING/ UNLOADING 1|TRANSPORTATION 1|DELIVERY|TRANSPORTATION 2|LOADING/ UNLOADING 2|
|---|---|---|---|---|---|---|---|
|s001|DECEMBER 24|b001|300|90|245|120|190|
|s002|DECEMBER 24|b001|240|100|200|980|150|
|s003|DECEMBER 25|b001|220|1200|150|97|150|
|s004|DECEMBER 25|b002|100|60|300|70|80|
|:|:|:|:|:|:|:|:|
1521
[FIG. 6]
|BASE ID|LOADING/ UNLOADING 1|TRANSPORTATION 1|DELIVERY|TRANSPORTATION 2|LOADING/ UNLOADING 2|
|---|---|---|---|---|---|
|b001|56.2|456.8|87.3|381.1|69.9|
|b002|58.5|25.8|106.6|23.1|65.5|
|b003|78.9|52.8|135.1|49.7|95.0|
|:|:|:|:|:|:|
1522

| BUSINESS ID | ADDITION OF DELIVERY DESTINATION | DELETION OF DELIVERY DESTINATION | CHANGE OF DELIVERY TIME POINT | .. |
|---|---|---|---|---|
| w001 | 7200 | 7200 | 3600 | .. |
| w002 | 10800 | 9000 | 7200 | .. |
| : | : | : | : | : |

| DEVICE ID | INSTALLATION POSITION | REAL-TIME ACQUISITION | REFERENCE TIME POINT | ACQUISITION INTERVAL | MAXIMUM INTERVAL OF ACQUISITION | MINIMUM INTERVAL OF ACQUISITION |
|---|---|---|---|---|---|---|
| h001 | t001 | AVAILABLE | ENGINE START | 2 | 120 | 1 |
| h002 | t002 | UNAVAILABLE | ENGINE START | 180 | 300 | 10 |
| h003 | d001 | UNAVAILABLE | 0:00 | 300 | 300 | 300 |

| CONDITION SET ID | CALCULATION TIME | NUMBER OF PACKAGES | VEHICLE RANK | OPERABLE TIME | RESTRICTION OF BERTH | MAXIMUM TRAVELING DISTANCE | RESTRICTION OF VEHICLE RANK | .. |
|---|---|---|---|---|---|---|---|---|
| c001 | 20 | 50 | 1 | 240 | NO | 150 | NO | .. |
| c002 | 300 | 45 | 2 | 240 | YES | 100 | NO | .. |
| c003 | 30 | 70 | 1 | 240 | NO | 150 | NO | .. |
| : | : | : | : | : | : | : | : | : |

| ROUTE ID | DELIVERY DATE | VEHICLE ID | DRIVER ID | DELIVERY DESTINATION | DELIVERY 1 | DELIVERY 2 | DELIVERY 3 | .. |
|---|---|---|---|---|---|---|---|---|
| r001 | DECEMBER 24 | t001 | d002 | BASE ID | b012 | b001 | b003 | .. |
| | | | | ARRIVAL TIME POINT | 12:30 | 13:45 | 14:00 | .. |
| | | | | DELIVERY PACKAGE | | L003 | L004 | .. |
| r002 | DECEMBER 24 | t002 | d012 | BASE ID | b025 | b003 | | .. |
| | | | | ARRIVAL TIME POINT | 13:20 | 13:50 | | .. |
| | | | | DELIVERY PACKAGE | | L005,L007 | | .. |
| r003 | DECEMBER 24 | t003 | d001 | BASE ID | b029 | b005 | b008 | .. |
| | | | | ARRIVAL TIME POINT | 14:00 | 15:00 | 15:20 | .. |
| | | | | DELIVERY PACKAGE | | L004 | L042 | .. |
| ⋮ | ⋮ | ⋮ | ⋮ | ⋮ | ⋮ | ⋮ | ⋮ | ⋮ |

[FIG. 11]
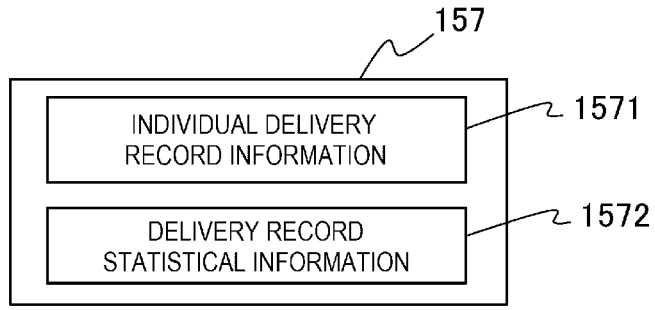
[FIG. 12]
                                                                                1571
| RECORD ID | ROUTE ID | RECORD | DELIVERY 1 | DELIVERY 2 | DELIVERY 3 | .. |
|---|---|---|---|---|---|---|
| a001 | r001 | ARRIVAL TIME POINT |  | 13:50 | 14:32 | .. |
|  |  | DEPARTURE TIME POINT | 12:40 | 13:58 | 15:00 | .. |
| a002 | r002 | ARRIVAL TIME POINT |  | 13:45 |  | .. |
|  |  | DEPARTURE TIME POINT | 13:15 | 14:50 |  | .. |
| a003 | r003 | ARRIVAL TIME POINT |  | 15:00 | 15:24 | .. |
|  |  | DEPARTURE TIME POINT | 14:05 | 15:06 | 15:43 | .. |
| : |  |  | : | : | : | : |
[FIG. 13]
                                                1572
| BASE ID | b001 | b002 | b003 | .. |
|---|---|---|---|---|
| b001 |  | 4.2 | 14.2 | .. |
| b002 | 10.4 |  | 6.0 | .. |
| b003 | 20.8 | 16.3 |  | .. |
| : | : | : | : | : |

[FIG. 14]
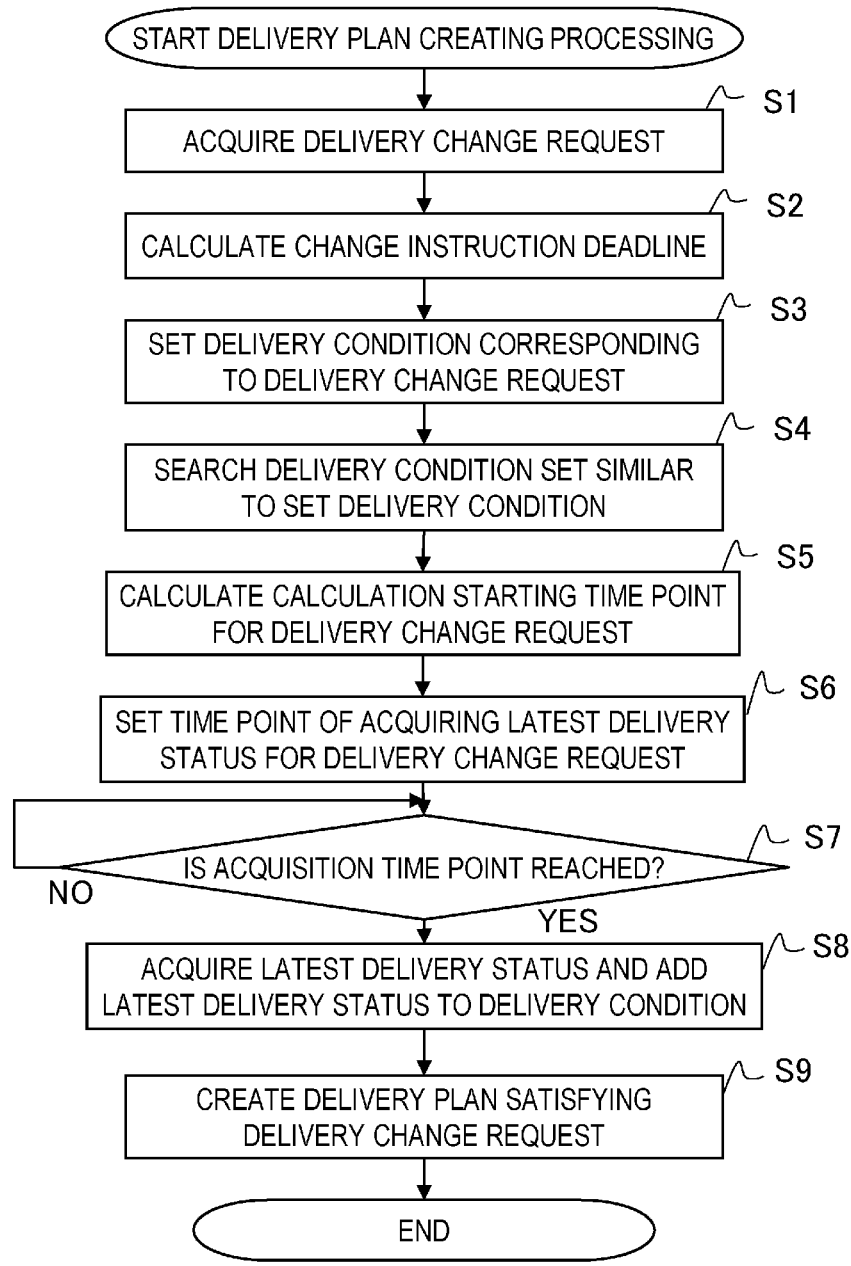

[FIG. 15]
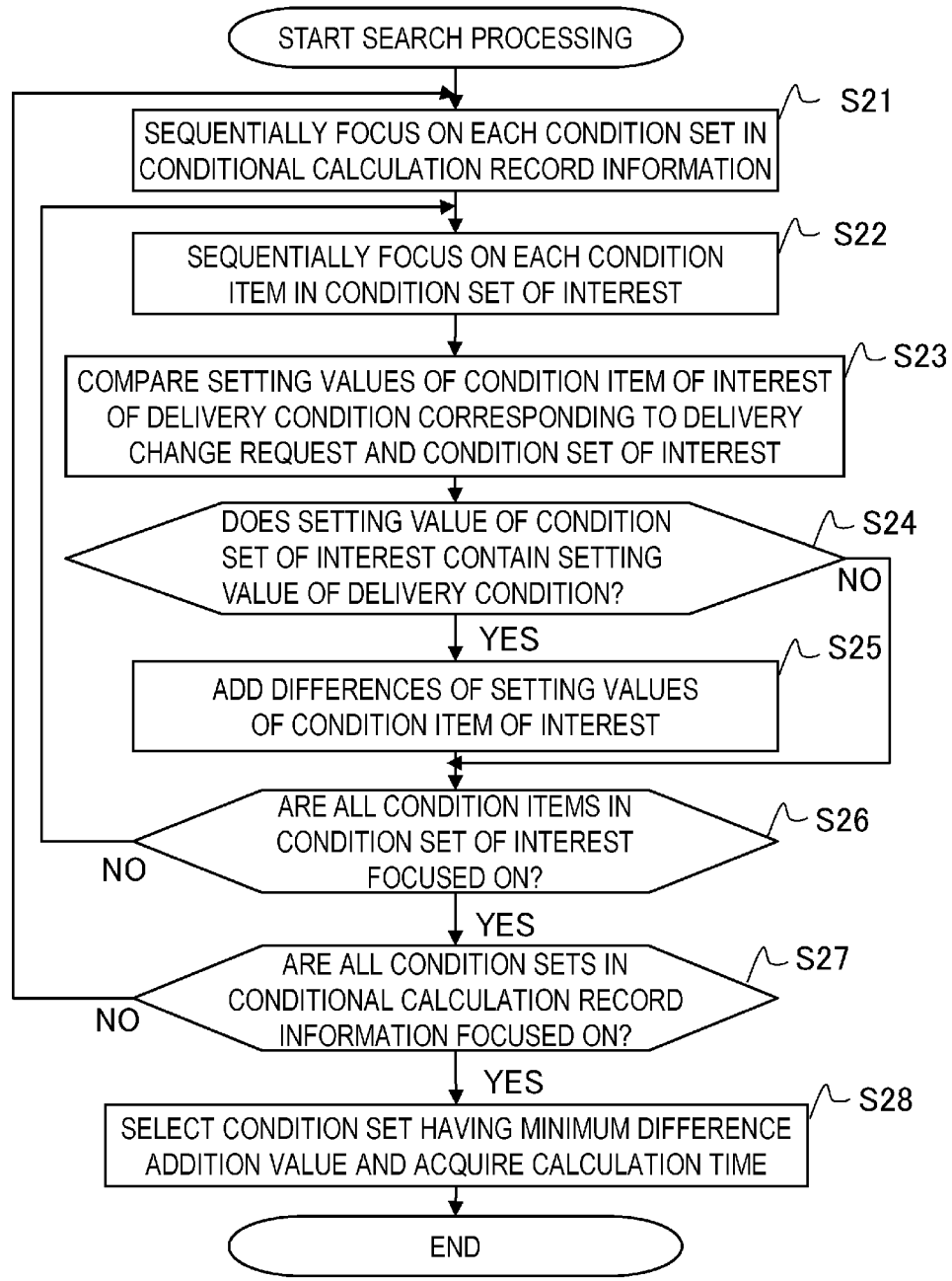

[FIG. 16]
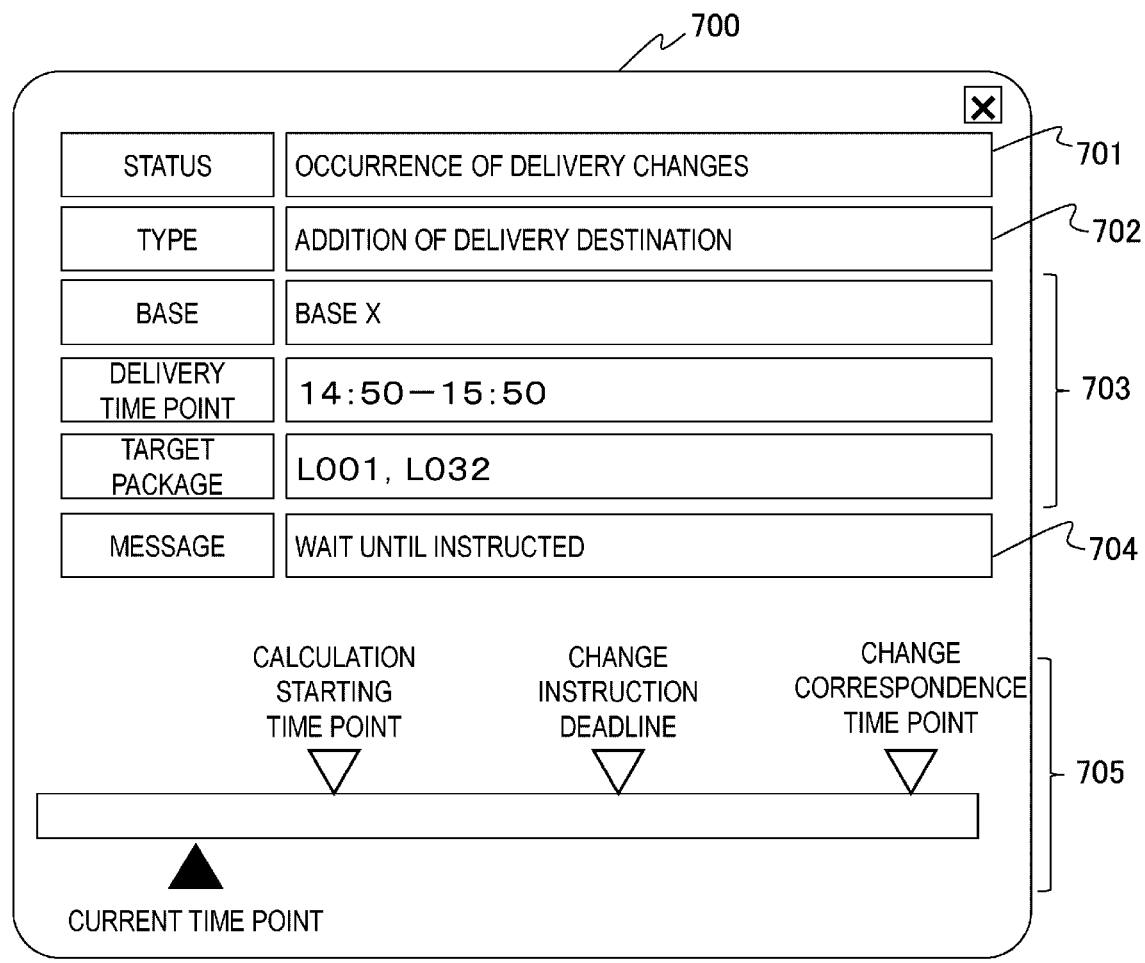

[FIG. 17]
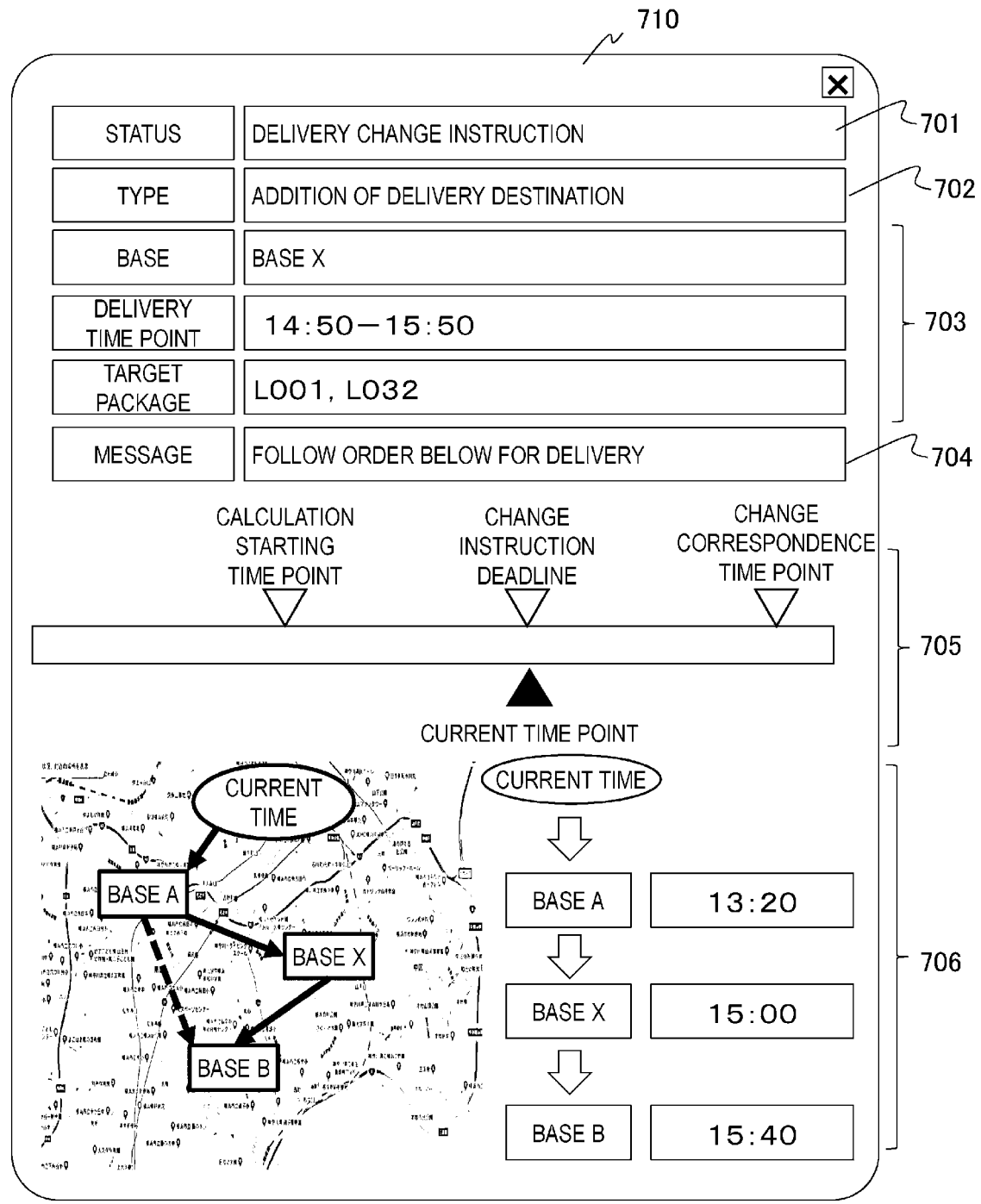

[FIG. 18]
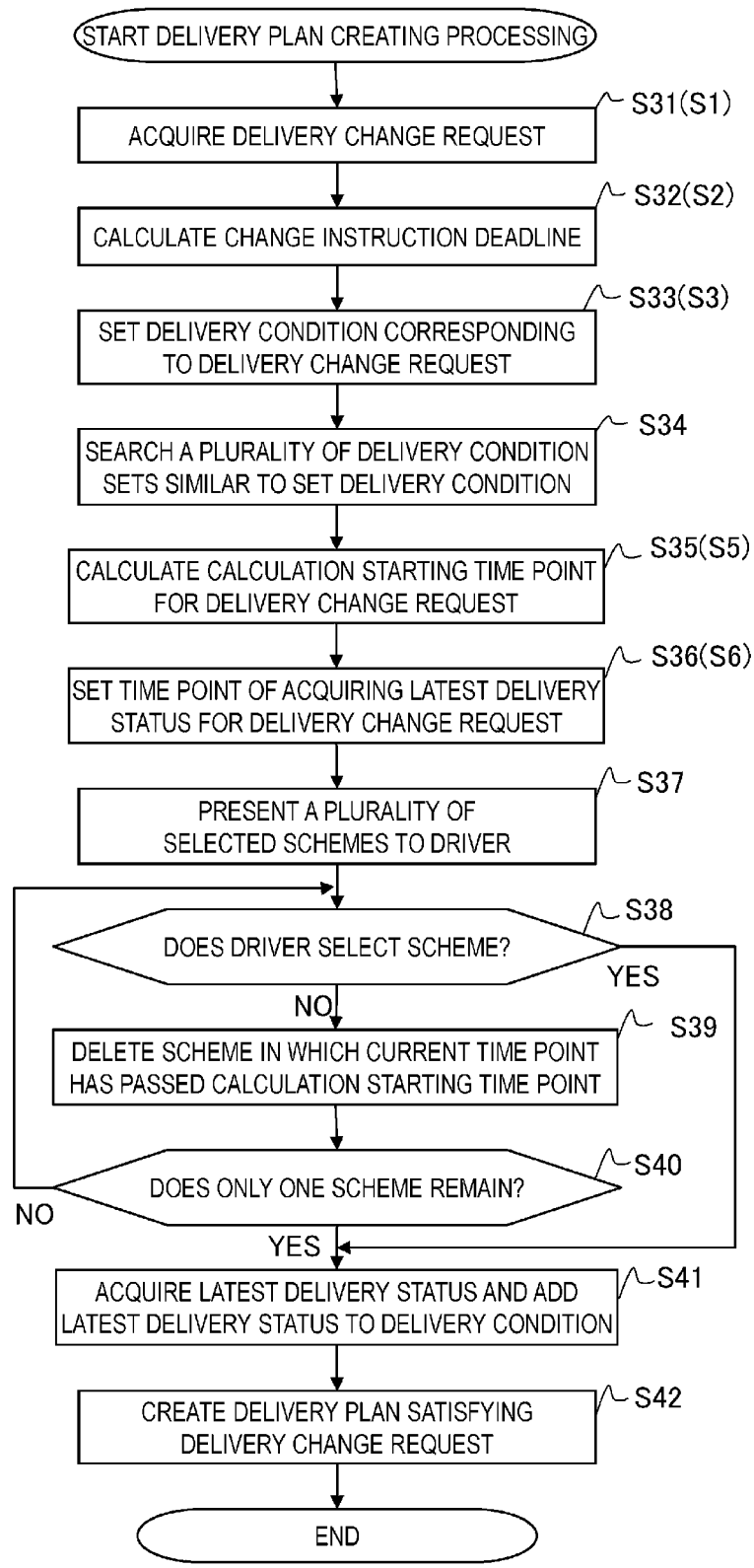

[FIG. 19]
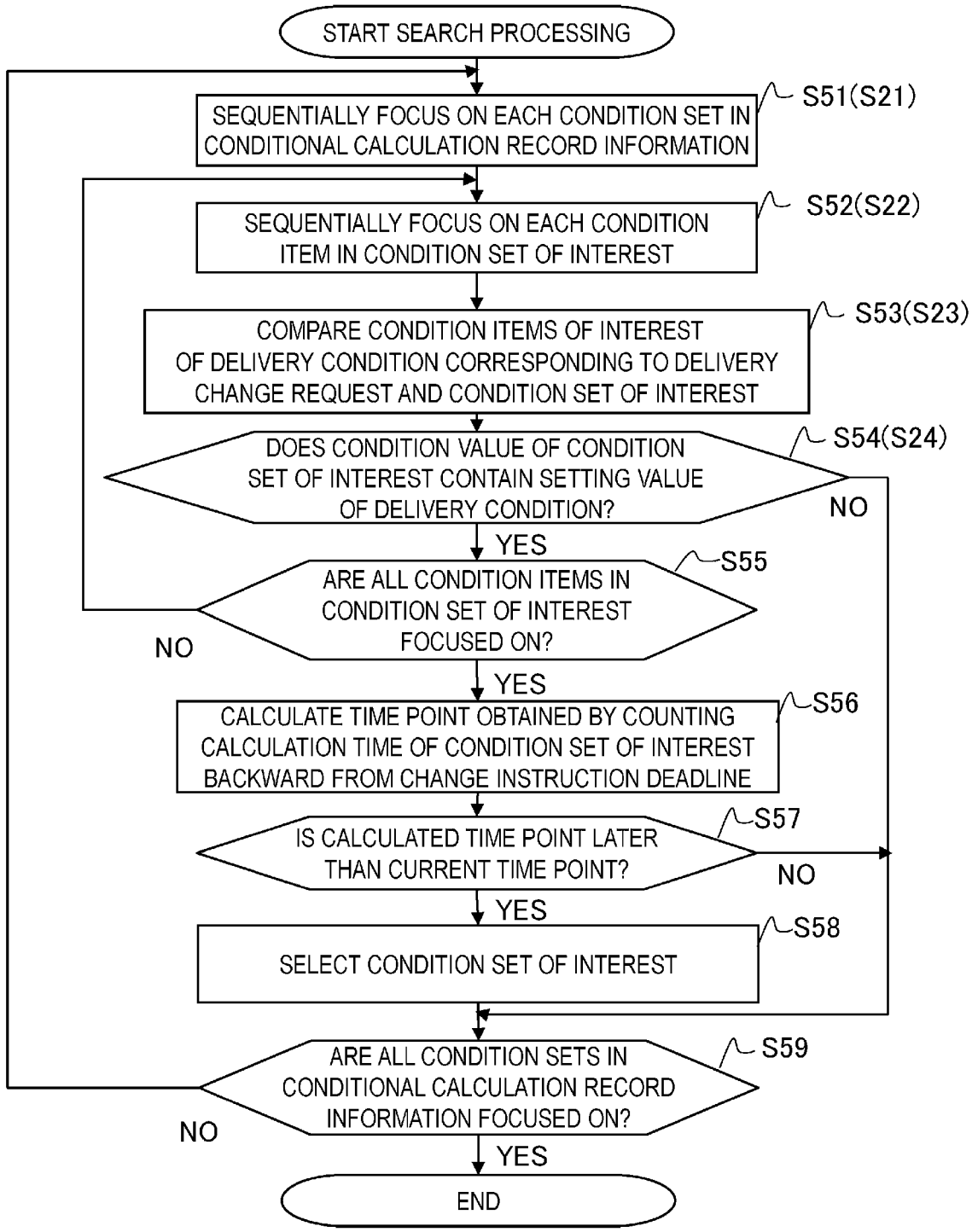

[FIG. 20]
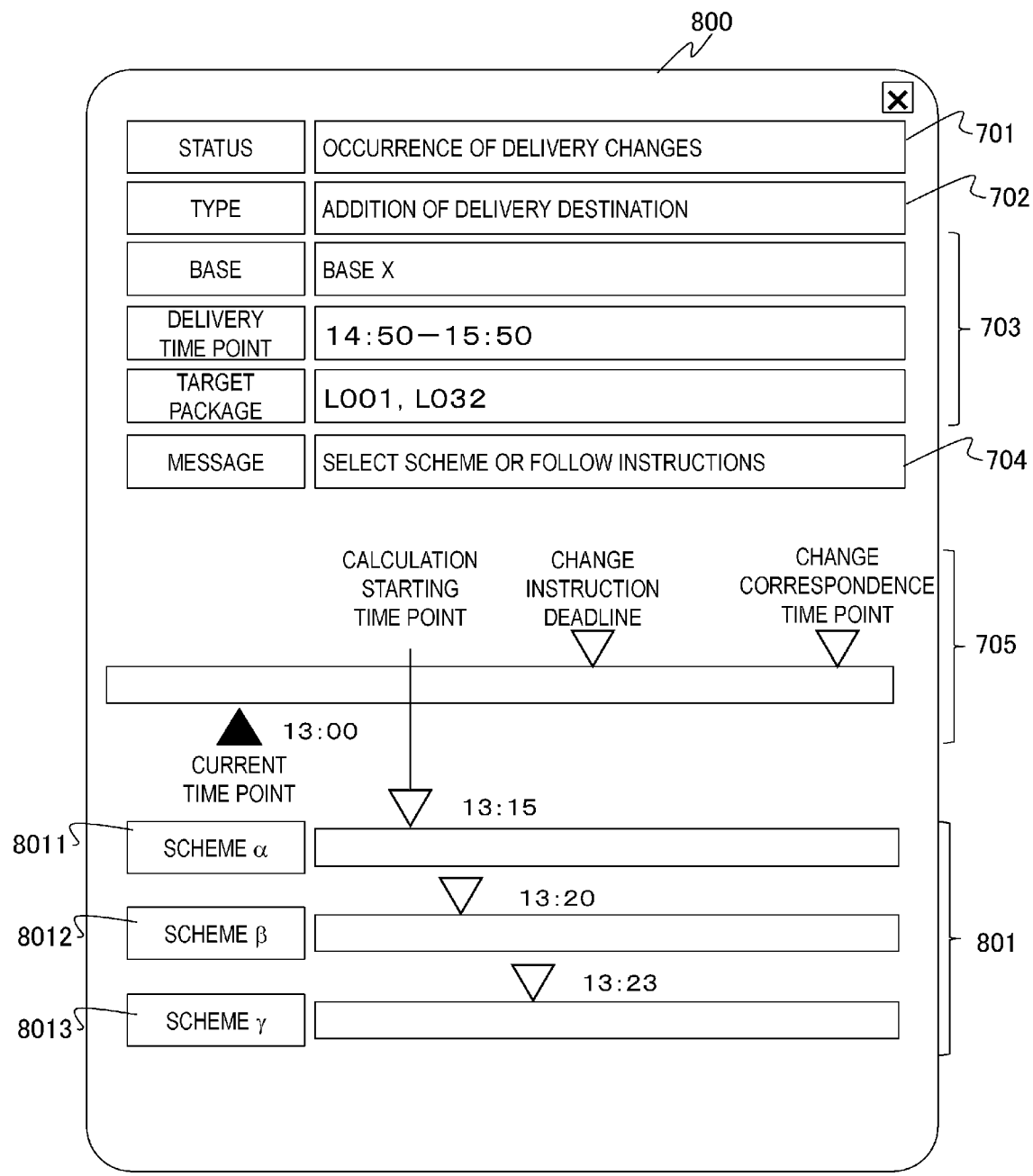

[FIG. 21]
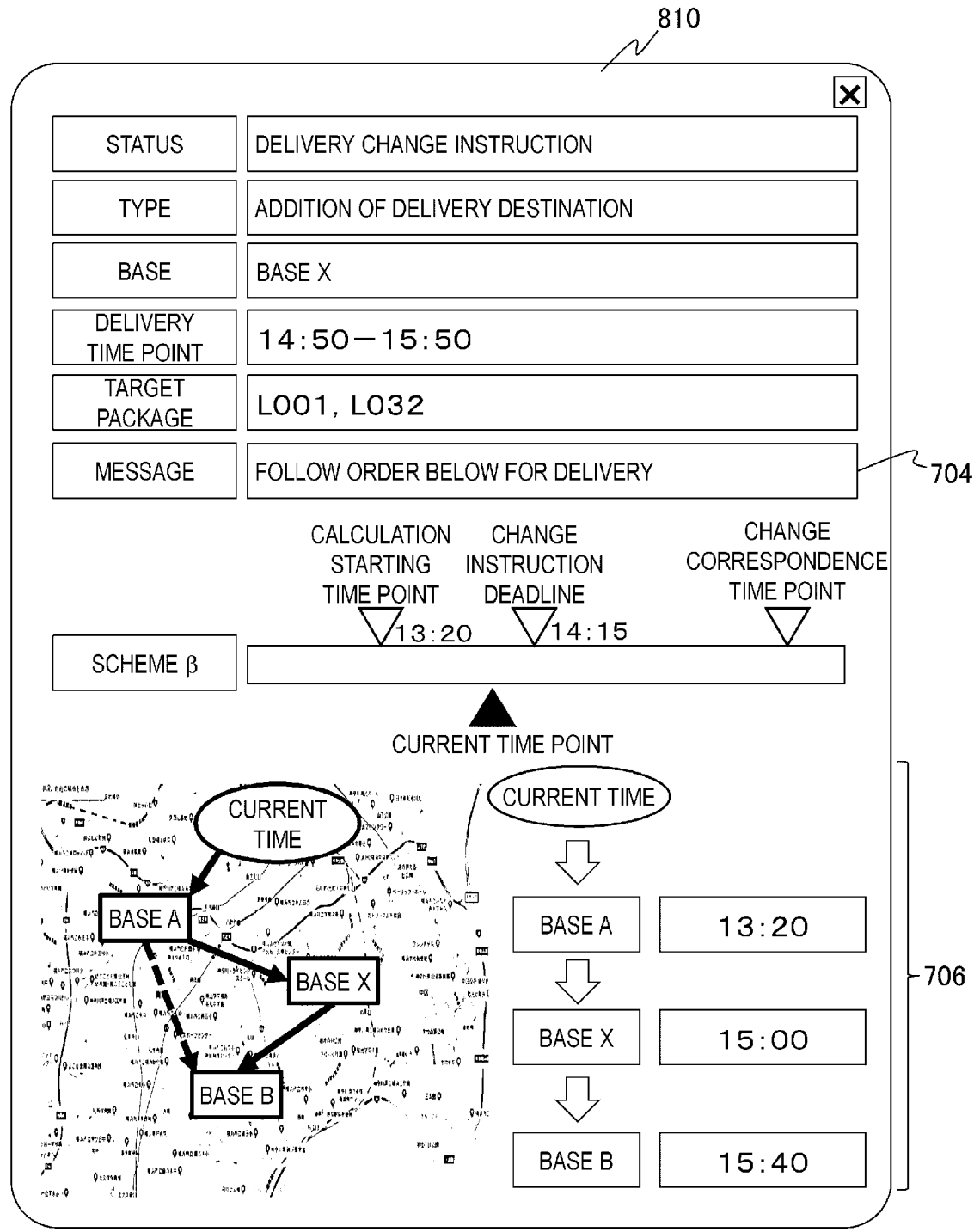

DELIVERY PLAN CREATING DEVICE AND DELIVERY PLAN CREATING METHOD

TECHNICAL FIELD

The present invention relates to a delivery plan creating device and a delivery plan creating method.

BACKGROUND ART

In recent years, the number of packages handled by delivery companies is drastically increased due to an increase in the number of users of online shopping. Regarding delivery of packages, a time specification service, a redelivery service, or the like is performed, and delivery companies need to create and change a delivery plan in accordance with requests from a customer, which may be generated dynamically.

Regarding the creation of the delivery plan, for example, Patent Literature 1 describes a technique in which a delivery plan is divided into time slots (time frames) and time slacks (buffer time for a time frame) in advance based on geographical conditions (a distance between bases), and a delivery order can be dynamically changed within a time frame specified by each time slot and each time slack.

Patent Literature 2 describes a technique in which delivery conditions can be dynamically determined by simulation and can meet delivery change requests even when a method of changing the delivery conditions to meet the delivery change requests has not been formulated.

CITATION LIST

Patent Literature

Patent Literature 1: JP-A-2015-201006
Patent Literature 2: JP-A-2018-092255

SUMMARY OF INVENTION

Technical Problem

In the technique described in Patent Literature 1, it is possible to meet the delivery change requests when a changed base (a delivery source or a delivery destination) is present within a range of constraints of a distance between bases. However, when the changed base is out of the range, the delivery order is not within the range specified by the time slot and time slack, and it is not possible to meet the delivery change requests. This is because the delivery condition set during initial creation of the delivery plan is applied as it is.

In the technique described in Patent Literature 2, the delivery conditions are dynamically determined by the simulation, but it is necessary to set calculation time for the simulation in advance, and a change deadline is not necessarily guaranteed. That is, the delivery conditions determined by the simulation may not be implemented at a stage of the calculation end.

In the techniques described in Patent Literatures 1 and 2, the delivery status is acquired when the delivery plan is changed, but the acquired delivery status is not necessarily the latest one. Thus, the delivery plan may not be changed to an optimal delivery plan even through the delivery plan can be changed to a better delivery plan.

The invention has been made in view of the above circumstances, and an object of the invention is to create a feasible delivery plan in accordance with a delivery change request that may be generated dynamically.

Solution to Problem

The present application includes a plurality of methods for solving at least a part of the above problems, and examples of the methods are as follows.

In order to solve the above problems, a delivery plan creating device according to an aspect of the invention includes: a delivery request acquisition unit configured to acquire a delivery change request generated dynamically; a change instruction deadline calculation unit configured to calculate, based on a delivery time range contained in the delivery change request, a change instruction deadline representing a deadline capable of instructing a change in a delivery plan; a storage unit configured to store conditional calculation record information in which a delivery condition set at a time of creating an executed delivery plan is in association with calculation time required for creating the executed delivery plan; a search unit configured to select a delivery condition set similar to the delivery change request from the conditional calculation record information; and a calculation starting time point calculation unit configured to calculate a calculation starting time point by counting the calculation time in association with the selected delivery condition set backward from the change instruction deadline.

Advantageous Effect

According to the invention, a feasible delivery plan can be created in accordance with a delivery change request that may be generated dynamically.

Problems, configurations, and effects other than those described above will be apparent from the following description of embodiments.

BRIEF DESCRIPTION OF DRAWINGS

FIG. 1 shows an example of a configuration of a delivery plan creating device according to a first embodiment of the invention.

FIG. 2 shows an example of a detailed configuration of a delivery condition setting unit.

FIG. 3 shows an example of base information.

FIG. 4 shows an example of work status information.

FIG. 5 shows an example of individual work status record information.

FIG. 6 shows an example of work status statistical information.

FIG. 7 shows an example of delivery change business information.

FIG. 8 show an example of status grasp timing information.

FIG. 9 shows an example of conditional calculation record information.

FIG. 10 shows an example of delivery plan information.

FIG. 11 shows an example of delivery record information.

FIG. 12 shows an example of individual delivery record information.

FIG. 13 shows an example of delivery record statistical information.

FIG. 14 is a flowchart showing an example of delivery plan creating processing according to the first embodiment of the invention.

FIG. 15 is a flowchart showing an example of search processing.

FIG. 16 shows a display example of an instruction screen for a driver.

FIG. 17 shows a display example of an instruction screen for a driver.

FIG. 18 is a flowchart showing an example of delivery plan creating processing according to a second embodiment of the invention.

FIG. 19 is a flowchart showing an example of search processing.

FIG. 20 shows a display example of an instruction screen for a driver.

FIG. 21 shows a display example of an instruction screen for a driver.

DESCRIPTION OF EMBODIMENTS

Hereinafter, a plurality of embodiments of the invention will be described with reference to the drawings. In all the drawings for describing the embodiments, the same members are denoted by the same reference numerals in principle, and repetitive descriptions thereof will be omitted. In the following embodiments, it is needless to say that constituent elements (including element steps and the like) are not necessarily essential unless otherwise particularly specified or clearly considered as essential in principle. It is needless to say that expressions "formed of A", "made of A", "having A", and "including A" do not exclude elements other than A unless it is clearly stated that A is the only element. Similarly, in the following embodiments, shapes, positional relation, or the like of the constituent elements or the like include those substantially approximate or similar to the shapes or the like unless otherwise particularly specified or when it is clearly considered that this is not the case in principle.

First Embodiment

FIG. 1 shows an example of a configuration of a delivery plan creating device 10 according to a first embodiment of the invention.

The delivery plan creating device 10 is provided in, for example, a delivery center of a delivery company, and dynamically creates and changes a delivery plan in accordance with a delivery change request that may be generated dynamically. Here, the delivery change request refers to, for example, a request such as a change or an addition of a base (a delivery source or a delivery destination), the number of packages, a delivery time point, and the like.

The delivery plan creating device 10 includes, for example, a general computer such as a personal computer including a central processing unit (CPU), a memory, a storage, an input device, an output device, and a communication module.

The delivery plan creating device 10 includes functional blocks such as a processing unit 11, an input unit 12, a display unit 13, a communication unit 14, and a storage unit 15.

The processing unit 11 includes a CPU of a computer and controls the entire delivery plan creating device 10. The processing unit 11 includes functional blocks which are a delivery condition setting unit 111, a delivery plan calculation unit 112, a calculation time measurement unit 113, a record analysis unit 114, a delivery status acquisition unit 115, and an instruction screen generation unit 116. These functional blocks are implemented by executing a predetermined program by the CPU.

The delivery condition setting unit 111 sets, in accordance with operation from a user using the input unit 12, a delivery condition (for example, an order of movement between bases, the type and the number of packages to be delivered to each base, and a delivery time point in each base) corresponding to a delivery change request by referring to various types of information stored in the storage unit 15.

FIG. 2 shows an example of a detailed configuration of the delivery condition setting unit 111. The delivery condition setting unit 111 includes functional blocks which are a delivery request acquisition unit 1111, a change instruction deadline calculation unit 1112, a search unit 1113, a calculation starting time point calculation unit 1114, and an operation detection unit 1115.

The delivery request acquisition unit 1111 acquires a delivery change request, which is input to the input unit 12 by a user (an operator or the like in a delivery company) in accordance with a request from a customer. The change instruction deadline calculation unit 1112 calculates a change instruction deadline indicating a time point at which a change of a delivery plan can be instructed. The search unit 1113 searches a delivery condition set similar to a delivery condition corresponding to the delivery change request from conditional calculation record information 155 (FIG. 9) in the storage unit 15. The calculation starting time point calculation unit 1114 calculates a time point of starting the calculation for creating a delivery plan in accordance with the delivery change request. The operation detection unit 1115 detects operation of a user (a truck driver or the like) on an instruction screen 800 (FIG. 20) displayed on a terminal device 30.

Referring back to FIG. 1, the delivery plan calculation unit 112 creates a delivery plan so as to satisfy the delivery condition input from the delivery condition setting unit 111. The creation of the delivery plan includes a case where a current delivery plan is changed. The created delivery plan is stored in the delivery plan information 156 of the storage unit 15.

The calculation time measurement unit 113 measures time (calculation time) required for calculation for creating the delivery plan in the delivery plan calculation unit 112, which satisfies the delivery condition from the delivery condition setting unit 111. The measured calculation time is recorded in the conditional calculation record information 155 (FIG. 9) of the storage unit 15.

The record analysis unit 114 analyzes time required for each type of work (work of loading and unloading packages at a base, transportation work, delivery work, work of transporting empty containers or the like, loading work, or the like) in a delivery record, and calculates statistical values (an average value or the like) of the time. The calculated statistical values are recorded in the work status statistical information 1522 (FIG. 6) of the storage unit 15. The record analysis unit 114 analyzes time of moving between bases in the delivery record and calculates statistical values of the time. The calculated statistical values are recorded in the delivery record statistical information 1572 (FIG. 13).

The delivery status acquisition unit 115 controls the communication unit 14 to acquire the latest delivery status from the terminal device 30.

The instruction screen generation unit 116 generates an instruction screen for issuing an instruction to the driver. The data of the generated instruction screen is transmitted to the terminal device 30 via network 20 by the communication unit 14.

The input unit 12 includes an input device such as a keyboard, a mouse, and a touch panel of a computer. The input unit 12 receives various inputs from a user (for example, an operator in the delivery company) and outputs the inputs to the processing unit 11.

The display unit 13 includes a display device such as a display and a projector of a computer, and displays an operation screen for a user to, for example, input various conditions.

The communication unit 14 includes a communication module of a computer and is connected to the terminal device 30 via the network 20.

The network 20 is, for example, a bidirectional communication network such as a local area network (LAN), the Internet, and a communication telephone network.

The terminal device 30 corresponds to an electronic device mounted on each truck of the delivery company or an electronic device carried by a driver of each truck. The terminal device 30 includes a built-in position information acquisition sensor such as a global positioning system (GPS) sensor. The terminal device 30 adds position information (a latitude, a longitude, an altitude, and the like) of a truck to a delivery status input by a truck driver who is a user, and transmits the delivery status to the communication unit 14.

The storage unit 15 includes a memory and a storage of a computer, and stores base information 151, work status information 152, delivery change business information 153, status acquisition timing information 154, conditional calculation record information 155, delivery plan information 156, and delivery record information 157.

FIG. 3 shows an example of the base information 151. The base information 151 is stored in advance in the storage unit 15, and information relating to a geographical condition of a base serving as a delivery source or a delivery destination of a package is recorded in the base information 151. In the case in FIG. 3, a latitude, a longitude, and an altitude [m] of a base, whether abase is a commercial facility (a collective facility such as a shopping center), and a method of transportation from a truck in a parking lot to a delivery place are recorded, in association with a base ID for identifying each base, in the base information 151.

FIG. 4 shows an example of the work status information 152. The work status information 152 includes individual work status record information 1521 and work status statistical information 1522.

FIG. 5 shows an example of the individual work status record information 1521. The individual work status record information 1521 is information in which actual time required for a series of work at the base is recorded. In the case in FIG. 5, a date, a base ID, time [sec] of loading/unloading 1, time [sec] of transportation 1, time [sec] of delivery, time [sec] of transportation 2, and time [sec] of loading/unloading 2 are recorded, in association with a status ID for identifying a series of work at each base, in the individual work status record information 1521.

Here, the loading/unloading 1 refers to work of unloading a package from a truck. The transportation 1 refers to work of transporting the package unloaded from the truck to the delivery destination. The delivery refers to work of handing a package to a customer. The transportation 2 refers to work of transporting an empty container, a cart, or the like from a delivery destination to a truck. The loading/unloading 2 refers to work of loading the empty container or the like on the truck.

FIG. 6 shows an example of the work status statistical information 1522. In the work status statistical information 1522, a statistical value of time required for each type of work, which is calculated by the record analysis unit 114 every time a work record is stored in the individual work status record information 1521, is recorded. In the case in FIG. 6, an average value of time [sec] of loading/unloading 1, time [sec] of transportation 1, time [sec] of delivery, time [sec] of transportation 2, and time [sec] required for loading/unloading 2 is recorded in association with a base ID. The statistical value is not limited to the average value and may be, for example, a median value. The statistical value of the various types of work, which is recorded in the work status statistical information 1522, is a reference of work time for creating a delivery plan.

FIG. 7 shows an example of the delivery change business information 153. The delivery change business information 153 is stored in advance in the storage unit 15, and time required for a series of supplementary businesses is recorded. The series of supplementary businesses are, for example, a change of a delivery ticket, a contact to a driver, a contact to each base, and adjustment of an acceptance system at a base, and occur in association with occurrence of the delivery change. In the case in FIG. 7, time [sec] required for a series of supplementary businesses when addition of a delivery destination occurs, time [sec] required for a series of supplementary businesses when deletion of a delivery destination occurs, and time [sec] required for a series of supplementary businesses when a change of a delivery time point occurs is recorded, in association with a business ID representing each business form of a delivery destination, in the delivery change business information 153. The business form of the delivery destination is, for example, a shopping center, a convenience store, a retail store, or the like.

FIG. 8 shows an example of the status acquisition timing information 154. The status acquisition timing information 154 is stored in advance in the storage unit 15, and information relating to timing of acquiring a delivery status from a terminal device 30 is recorded in the status acquisition timing information 154. In the case in FIG. 8, an installation position, an availability of real-time acquisition of a delivery status, a reference time point, an acquisition interval [sec], the maximum interval [sec] of acquisition, and the minimum interval [sec] of acquisition are recorded, in association with a device ID for identifying the terminal device 30, in the status acquisition timing information 154. A truck ID for identifying a truck on which the terminal device 30 is mounted, or a driver ID for identifying a driver carrying the terminal device 30 is recorded in the column of "installation position". The reference time point is a time point of starting transmission of a delivery status. The acquisition interval can be specified by the user within a range of the minimum interval to the maximum interval.

FIG. 9 shows an example of the conditional calculation record information 155. In the conditional calculation record information 155, a delivery condition when a delivery plan is actually created by the delivery plan calculation unit 112, and calculation time required for the creation of the delivery plan which is measured by the calculation time measurement unit 113 are recorded. In the case in FIG. 9, calculation time [sec], the number of packages (the number of pallets, or the like), a vehicle rank of a truck, operable time [min] of a truck, presence or absence of restrictions of a berth (a loading/unloading position of a truck) at a base, the maximum traveling distance [km], presence or absence of restrictions of a vehicle rank of a truck at a base, and the like are recorded in association with a condition set ID for identifying a combination of the delivery conditions.

FIG. 10 shows an example of the delivery plan information 156. In the delivery plan information 156, details of a delivery plan created by the delivery plan calculation unit 110 are recorded. In the case in FIG. 10, a delivery date, a vehicle ID, a driver ID, a base ID of each delivery destination, an arrival time point, and a delivery package are recorded in an order of delivery, in association with a route ID for identifying the delivery plan, in the delivery plan information 156.

FIG. 11 shows an example of the delivery record information 157. The delivery record information 157 includes individual delivery record information 1571 and delivery record statistical information 1572.

FIG. 12 shows an example of the individual delivery record information 1571. In the individual delivery record information 1571, a delivery record for each route ID is recorded. The individual delivery record information 1571 is updated every time delivery is actually performed based on the delivery plan. In the case in FIG. 12, a route ID, and an arrival time point and a departure time point at each base are recorded in an order of delivery in association with a record ID for identifying a delivery record. The arrival time point and the departure time point at each base can be acquired from the terminal device 30.

FIG. 13 shows an example of the delivery record statistical information 1572. In the delivery record statistical information 1572, a statistical value (an average value or the like) of time [min] of moving between bases, which is calculated by the record analysis unit 114 based on the individual delivery record information 1571, is recorded. The statistical value may be a median value or the like in addition to the average value. For example, time of moving between a delivery n base and a delivery n−1 base is calculated by subtracting a departure time point at the delivery n−1 base from an arrival time point at the delivery n base in the individual delivery record information 1571. The work status statistical information 1522 is a reference of the time of moving between bases for creating a delivery plan.

<Delivery Plan Creation Processing According to First Embodiment>

Next, FIG. 14 is a flowchart showing an example of the delivery plan creation processing according to the first embodiment.

The delivery plan creation processing is started, for example, in accordance with predetermined operation from an operator on the delivery plan creating device 10.

First, the delivery request acquisition unit 1111 acquires, from the input unit 12, a delivery change request input by a user (an operator or the like in a delivery company) (step S1).

Next, the change instruction deadline calculation unit 1112 calculates a change instruction deadline indicating a time point when a change of a delivery plan can be instructed (step S2). For example, when a delivery change request for a truck A is "adding the work of delivering a package L within a delivery time range from 14:50 to 15:50 for a base X having a business form w001", time 7200 [secs] required for a series of supplementary businesses for addition of a delivery destination to the base X having the business form w001 is acquired with reference to the delivery change business information 153 (FIG. 7) in the storage unit 15. Then, the change instruction deadline 13:50 is calculated by counting 7200 [secs] backward from an end time point 15:50 of the delivery time range.

Next, the delivery request acquisition unit 1111 sets a delivery condition corresponding to the delivery change request (step S3). Specifically, the delivery change request acquired in step S1 is converted into a delivery condition suitable for an input to the delivery plan calculation unit 112.

Next, the search unit 1113 searches a delivery condition set similar to the delivery condition corresponding to the delivery change request from the conditional calculation record information 155 (FIG. 9) in the storage unit 15 (step S4).

FIG. 15 is a flowchart showing an example of the search processing in step S4.

First, the search unit 1113 sequentially focuses on each condition set (c001, c002, c003, and the like) recorded in the conditional calculation record information 155 (step S21). Next, the search unit 1113 sequentially focuses on each condition item (the delivery number, the vehicle rank, the operable time, the restrictions of a berth, the maximum traveling distance, the restrictions of a vehicle rank, and the like) in a condition set of interest (step S22).

Next, the search unit 1113 compares a setting value of a condition item of interest of the delivery condition corresponding to the delivery change request with a setting value of a condition item of interest of the condition set of interest (step S23), and determines whether the setting value of the condition set of interest contains the setting value of the delivery condition corresponding to the delivery change request (step S24).

Here, when determining that the setting value of the condition set of interest contains the setting value of the delivery condition corresponding to the delivery change request (YES in step S24), the search unit 1113 calculates a difference between the setting value of the condition set of interest and the setting value of the delivery condition corresponding to the delivery change request and adds the calculated difference to a difference addition value for each condition set of interest (step S25). When the setting value is not a numerical value, the setting value is converted into a numerical value as appropriate to calculate a difference.

On the contrary, the search unit 1113 skips step S25 when determining that the setting value of the condition set of interest does not contain the setting value of the delivery condition corresponding to the delivery change request (NO in step S24).

Next, the search unit 1113 determines whether all the condition items in a condition set of interest are focused on (step S26). Here, when determining that not all the condition items in the condition set of interest are focused on, that is, a condition item that is not focused on remains (NO in step S26), the search unit 1113 returns the processing to step S22, and repeats step S22 and the subsequent steps.

Thereafter, when determining that all the condition items in the condition set of interest are focused on (YES in step S26), the search unit 1113 determines whether all the condition sets recorded in the conditional calculation record information 155 are focused on (step S27). Here, when determining that not all the condition sets recorded in the conditional calculation record information 155 are focused on, that is, a condition set that is not focused on remains (NO in step S27), the search unit 1113 returns the processing to step S21 and repeats step S21 and the subsequent steps.

Thereafter, when determining that all the condition sets recorded in the conditional calculation record information 155 are focused on (YES in step S27), the search unit 1113 selects a condition set having a minimum difference addition value corresponding to each of all the condition sets, and acquires calculation time corresponding to the selected condition set from the conditional calculation record information 155 (step S28). Thus, the search processing in step S4 in FIG. 14 is ended.

The search processing described in detail with reference to FIG. 15 is an example thereof, and other methods may be used as long as one delivery condition set similar to the delivery change request can be selected.

Referring back to FIG. 14, next, the calculation starting time point calculation unit 1114 calculates a calculation starting time point by counting only the calculation time acquired in step S28 backward from the change instruction deadline calculated in step S2 (step S5). For example, when the change instruction deadline calculated in step S2 is 13:50 and the calculation time acquired in step S28 is 300 [secs] (=5 [mins]), the calculation starting time point is calculated to be 13:45 by counting 5 [mins] backward from 13:50.

Next, the delivery status acquisition unit 115 sets, based on the status acquisition timing information 154 in the storage unit 15, a delivery status acquisition time point representing a time point of acquiring the latest delivery status in time for the calculation starting time point calculated in step S5 (step S6). Specifically, the delivery status acquisition time point is set by specifying a device ID of the terminal device 30 mounted on the truck A or a device ID of the terminal device 30 carried by a driver of the truck A from the status acquisition timing information 154, reading a corresponding acquisition interval from the status acquisition timing information 154, and subtracting the acquisition interval from the calculation starting time point.

Next, the delivery status acquisition unit 115 determines whether the delivery status acquisition time point set in step S6 is reached (step S7), and repeats the determination when determining that the delivery status acquisition time point is not reached (NO in step S7).

Thereafter, when determining that the delivery status acquisition time point is reached (YES in step S7), the delivery status acquisition unit 115 acquires the latest delivery status from the terminal device 30 of the truck A by controlling the communication unit 14, and the delivery condition setting unit 111 adds a delivery status of the truck A to the delivery condition based on the latest delivery status (step S8).

For example, when it is determined, based on the latest delivery status, that the delivery status of the truck A is in the work of transportation 2 at a base b001, work time 381.1 [secs] of the transportation 2 and work time 69.9 [secs] of the loading/unloading 2 which correspond to the base b001 is acquired from the work status statistical information 1522 (FIG. 6) in the storage unit 15 to calculate a sum of the work time 381.1 [secs] of the transportation 2 and the work time 69.9 [secs] of the loading/unloading 2 to be 451.0 [secs], and the remaining work time 451.0 [secs] at the base b001 is added to the delivery condition.

Finally, the delivery condition setting unit 111 outputs the delivery condition to the delivery plan calculation unit 112 when the calculation starting time point is reached, and the delivery plan calculation unit 112 creates a delivery plan satisfying the delivery condition (step S9). Thus, the delivery plan creating processing is ended.

According to the delivery plan creating processing described above, a calculation starting time point can be determined in consideration of calculation time required to create the delivery plan, and a delivery plan can be created using the latest delivery status as much as possible, in accordance with a delivery change request that may be generated dynamically.

<Display Example of Instruction Screen for Driver>

Next, FIG. 16 shows a display example of an instruction screen 700 for a driver at a time point when a delivery change request is generated.

The instruction screen 700 includes a status display area 701, a type display area 702, a detail display area 703, a message display area 704, and a time axis display area 705.

A correspondence status of the delivery plan creating device 10 for a delivery change request is displayed in the status display area 701. Types of the delivery change request (addition of a delivery destination, deletion of a delivery destination, a change of a delivery time point, or the like) are displayed in the type display area 702. Contents (a base, a delivery time point, a target package, or the like) of the delivery change request are displayed in the detail display area 703. Instructions for the driver are displayed in the message display area 704. Temporal positional relation among a calculation starting time point, a change instruction deadline, a change correspondence time point, and a current time point is displayed in the time axis display area 705.

In the case in FIG. 16, the term "occurrence of delivery changes" is displayed in the status display area 701, the term "addition of a delivery destination" is displayed in the type display area 702, a base, a delivery time point, and a target package for the added delivery destination are displayed in the detail display area 703, and the sentence that "Wait until instructed." is displayed in the message display area 704. A fact that the current time point is before the calculation starting time point is displayed in the time axis display area 705.

Next, FIG. 17 shows a display example of an instruction screen 710 for the driver at a time point when a delivery plan is created (changed) in accordance with a delivery change request.

Similar to the instruction screen 700, the instruction screen 710 includes the areas. The same reference numerals are attached to display areas common to those of the instruction screen 700, and the descriptions thereof are omitted. The same applies to subsequent drawings.

The instruction screen 710 further includes a delivery plan display area 706 in which an overview of a delivery plan is displayed. In the case in FIG. 17, the term "delivery change instruction" is displayed in the status display area 701. Displays in the type display area 702 and the detail display area 703 are the same as the display example in FIG. 16. A sentence that "Follow the order below for delivery." is displayed in the message display area 704. The fact that the current time point reaches the change instruction deadline is displayed in the time axis display area 705. A map including the added base X and an estimated arrival time point of each base are displayed in an order of delivery in the delivery plan display area 706.

The driver can quickly grasp the changed delivery plan by looking at the instruction screen 710.

In the first embodiment described above, only one delivery plan that can meet the delivery change request can be created. However, in actual delivery businesses, businesses other than the delivery such as sales at a customer site may be performed in addition to simply carrying packages. Therefore, it is desirable to prepare a plurality of options for the delivery plan, considering time spent on the businesses other than the delivery.

<Delivery Plan Creating Device According to Second Embodiment of Invention>

Next, a second embodiment of the invention capable of creating a plurality of delivery plans that can meet a delivery change request will be described. The delivery change request may be generated dynamically.

An example of a configuration of the delivery plan creating device according to the second embodiment is the same as the example of the configuration of the delivery plan creating device 10 (FIG. 1) according to the first embodiment described above, so that the description thereof is omitted.

<Delivery Plan Creation Processing According to Second Embodiment>

FIG. 18 is a flowchart showing an example of delivery plan creating processing by the delivery plan creating device according to the second embodiment.

Steps S31 to S33, S35, and S36 in the delivery plan creating processing are the same as steps S1 to S3, S5, and S6 in the delivery plan creating processing (FIG. 14) according to the first embodiment described above respectively, so that descriptions thereof will be omitted as appropriate.

The delivery plan creation processing is started, for example, in accordance with predetermined operation from an operator on the delivery plan creating device 10.

First, the delivery request acquisition unit 1111 acquires a delivery change request (step S31), and the change instruction deadline calculation unit 1112 calculates a change instruction deadline (step S32). Next, the delivery request acquisition unit 1111 sets a delivery condition corresponding to the delivery change request (step S33).

Next, the search unit 1113 searches a plurality of delivery condition sets similar to the delivery change request acquired in step S31 from the conditional calculation record information 155 of the storage unit 15 (step S34).

FIG. 19 is a flowchart showing an example of the search processing in step S34.

Steps S51 to S54 in the search processing are the same as steps S21 to S24 in the search processing (FIG. 15) in step S4 of the delivery plan creating processing according to the first embodiment described above, so that descriptions thereof will be omitted as appropriate.

First, the search unit 1113 sequentially focuses on each condition set recorded in the conditional calculation record information 155 (step S51). Next, the search unit 1113 sequentially focuses on each condition item in the condition set of interest (step S52).

Next, the search unit 1113 compares a setting value of a condition item of interest of the delivery condition corresponding to the delivery change request with a setting value of a condition item of interest of the condition set of interest (step S53), and determines whether the setting value of the condition set of interest contains the setting value of the delivery condition corresponding to the delivery change request (step S54). Here, when determining that the setting value of the condition set of interest does not contain the setting value of the delivery condition corresponding to the delivery change request (NO in step S54), the search unit 1113 skips steps S55 to S58 to advance the processing to step S59 (all will be described below).

On the contrary, when determining that the setting value of the condition set of interest contains the setting value of the delivery condition corresponding to the delivery change request (YES in step S54), the search unit 1113 then determines whether all the condition items in the condition set of interest are focused on (step S55). Here, when determining that not all the condition items in the condition set of interest are focused on, that is, a condition item that is not focused on remains (NO in step S55), the search unit 1113 returns the processing to step S52, and repeats step S52 and the subsequent steps.

Thereafter, when determining that all the condition items in the condition set of interest are focused on (YES in step S55), the search unit 1113 then acquires calculation time of the condition set of interest from the conditional calculation record information 155, and calculates a time point (a calculation starting time point) obtained by counting the acquired calculation time backward from the change instruction deadline calculated in step S32 (step S56).

Next, the search unit 1113 determines whether the time point calculated in step S56 is later than a current time point (step S57). Here, when determining that the time point calculated in step S56 is later than the current time point (YES in step S57), the search unit 1113 selects the condition set of interest (step S58).

Next, the search unit 1113 determines whether all the condition sets recorded in the conditional calculation record information 155 are focused on (step S59). Here, when determining that not all the condition sets recorded in the conditional calculation record information 155 are focused on, that is, a condition set that is not focused on remains (NO in step S59), the search unit 1113 returns the processing to step S51 and repeats step S51 and the subsequent steps.

Thereafter, when the search unit 1113 determines that all the condition sets recorded in the conditional calculation record information 155 are focused on (YES in step S59), the search processing is ended.

The search processing described in detail with reference to FIG. 19 is an example thereof, and other methods may be used as long as a plurality of delivery condition sets similar to the delivery change request can be searched.

Referring back to FIG. 18, next, the calculation starting time point calculation unit 1114 calculates a calculation starting time point corresponding to each of the plurality of selected condition sets by counting the calculation time of each condition set selected by the search processing described above backward from the change instruction deadline calculated in step S31 (step S35). Instead of executing step S35, calculation results of step S56 may be used.

Next, the delivery status acquisition unit 115 sets, based on the status acquisition timing information 154 in the storage unit 15, a delivery status acquisition time point representing a time point when the latest delivery status is acquired in time for each of the plurality of calculation starting time points calculated in step S35 (step S36).

Next, the instruction screen generation unit 116 generates data of an instruction screen 800 (FIG. 20) in which the plurality of calculated calculation starting time points are displayed and are selected by a user, and outputs the data to the communication unit 14. The communication unit 14 transmits data of the instruction screen 800 to the terminal device 30 via the network 20. Accordingly, the instruction screen 800 is displayed on the terminal device 30 (step S37).

FIG. 20 shows a display example of the instruction screen 800. Similar to the instruction screen 700 (FIG. 16), the instruction screen 800 includes the status display area 701, the type display area 702, the detail display area 703, the message display area 704, and the time axis display area 705.

The instruction screen 800 further includes a selection condition set display area 801. Time axes including the calculated calculation starting time points as a plurality of schemes for a user to select, and selection buttons 8011 to 8013 for a driver to input selection operation are displayed in an order of the calculation starting time points in the selection condition set display area 801. The driver can select anyone of the plurality of schemes by operating any one of the selection buttons 8011 to 8013.

In the case in FIG. 20, a message that "Select a scheme or follow the instructions.", which prompts the driver to select a scheme, is displayed in the message display area 704.

Three schemes (a scheme α, a scheme β, and a scheme γ), the number of which is the same as the number of the selected condition sets, are displayed in the selection condition set display area 801 of the instruction screen 800. Alternatively, the number of the selected condition sets and the number of the schemes are not limited to three, and may be two or more, or four or more.

In the case in FIG. 20, the current time point is 13:00, and the three schemes (the scheme α, the scheme β, and the scheme γ) are displayed in the selection condition set display area 801. Thereafter, with the passage of time points, a scheme in which the current time point has passed a calculation starting time point is deleted from the instruction screen 800 and excluded from the options. For example, the scheme α is deleted when the current time point has passed 13:15, and further, the scheme β is deleted when the current time point has passed 13:20. Thus, only the scheme γ remains. Then, it is considered that the scheme γ remaining in the instruction screen 800 is selected by the user.

Referring back to FIG. 18, next, the operation detection unit 1115 determines whether any one of the selection buttons 8011 to 8013 on the instruction screen 800 is operated, that is, whether the driver selects any one of the plurality of schemes (step S38). Here, when it is determined that none of the schemes is selected (NO in step S38), the instruction screen generation unit 116 deletes a scheme, in which a current time point has passed a calculation starting time point, from the instruction screen 800, and the search unit 1113 excludes the scheme from the options (step S39).

Next, the search unit 1113 determines whether only one scheme (the scheme γ in the case in FIG. 20) having the latest calculation starting time point remains (step S40). Here, when it is determined that not only one scheme having the latest calculation starting time point but also a plurality of schemes remain (NO in step S40), the processing returns to step S38, and step S38 and the subsequent steps are repeated.

Thereafter, when the search unit 1113 determines that only one scheme having the latest calculation starting time point remains (YES in step S40), the operation detection unit 1115 assumes that the remaining one scheme is selected by the user and advances the processing to step S41.

When the operation detection unit 1115 determines, in step S38, that the driver selects any one of the plurality of presented schemes (YES in step S38), the steps S39 and S40 are skipped, and the processing is advanced to step S41.

Next, the delivery status acquisition unit 115 acquires the latest delivery status from the terminal device 30 of the truck A by controlling the communication unit 14 when the delivery status acquisition time point corresponding to the selected scheme is reached, and the delivery condition setting unit 111 adds a loss status of the truck A to the delivery condition based on the latest delivery status (step S41).

Finally, the delivery condition setting unit 111 outputs the delivery condition to the delivery plan calculation unit 112 when the calculation starting time point is reached, and the delivery plan calculation unit 112 creates a delivery plan satisfying the delivery condition (step S42). Thus, the delivery plan creating processing is ended.

According to the delivery plan creating processing described above, a plurality of calculation starting time points in consideration of the calculation time required to create the delivery plan can be presented as options to the user, and a delivery plan can be created using the latest delivery status as much as possible, in accordance with a delivery change request that may be generated dynamically.

Next, FIG. 21 shows a display example of an instruction screen 810 for a driver at a time point when the scheme β is selected in the instruction screen 800 (FIG. 20) and a delivery plan is created (changed) in accordance with the scheme β.

Similar to the instruction screen 710 (FIG. 17), the instruction screen 810 includes the status display area 701, the type display area 702, the detail display area 703, the message display area 704, the time axis display area 705, and the delivery plan display area 706.

In the case in FIG. 21, a display of the status display area 701 is changed to a "delivery change instruction", and an instructional message that "Follow the order below for delivery." to a driver is displayed in the message display area 704.

The driver can quickly grasp the changed delivery plan by looking at the instruction screen 810.

During a period in which any scheme is selected on the instruction screen 800 (FIG. 20) and a display of the terminal device 30 transitions to the instruction screen 810, that is, during a period in which calculation for the creation of a delivery plan is executed, a selected button among the selection buttons 8011 to 8013 may be highlighted, or the remaining calculation time until the instruction screen 810 is displayed may be displayed.

The invention is not limited to the embodiments described above, and various modifications can be made. For example, the embodiments described above have been described in detail for easy understanding of the invention, and are not necessarily limited to those including all the configurations described above. Apart of the configuration of an embodiment may be replaced with or added to the configuration of another embodiment.

A part or all of the configurations, functions, processing units, processing methods and the like described above may be implemented by hardware, for example, through design using an integrated circuit. Each of the configurations, functions, and the like described above may be implemented by software by interpreting and executing a program for implementing functions by the processor. Information such as a program, a table, and a file for implementing each function can be stored in a recording device such as a memory, a hard disk, or a solid state drive (SSD), or in a recording medium such as an IC card, an SD card, or a DVD. Control lines or information lines indicate what is considered necessary for description, and not all the control lines or information lines are necessarily shown in a product. It may be considered that almost all the configurations are actually connected to one another.

REFERENCE SIGNS LIST

10 . . . Delivery plan creating device, 11 . . . Processing unit, 110 . . . Delivery plan calculation unit, 111 . . . Delivery condition setting unit, 1111 . . . Delivery request acquisition unit, 1112 . . . Change instruction deadline calculation unit, 1113 . . . Search unit, 1114 . . . Calculation starting time point calculation unit, 1115 . . . Operation detection unit, 112 . . . Delivery plan calculation unit, 113 . . . Calculation time measurement unit, 114 . . . Record analysis unit, 115 . . . Delivery status acquisition unit, 151 . . . Base information, 152 . . . Work status information, 1521 . . . Individual work status record information, 1522 . . . Work status statistical information, 153 . . . Delivery change business information, 154 . . . Status acquisition timing information, 155 . . . Conditional calculation record information, 156 . . . Delivery plan information, 157 . . . Delivery record information, 1571 . . . Individual delivery record information, 1572 . . . Delivery record statistical information, 116 . . . Instruction screen generation unit, 12 . . . Input unit, 13 . . . Display unit, 13 . . . Display unit, 14 . . . Communication unit, 15 . . . Storage unit, 20 . . . Network, 30 . . . Terminal device 700 . . . Instruction screen, 701 . . . Status display area, 702 . . . Type display area, 703 . . . Detail display area, 704 . . . Message display area, 705 . . . Time axis display area, 706 . . . Delivery plan display area, 710 . . . Instruction screen, 800 . . . Instruction screen, 801 . . . Selection condition set display area, 8011 to 8013 . . . Selection button, 810 . . . Instruction screen

The invention claimed is:

1. A delivery plan creating device comprising:
an input device;
a communication device;
a memory configured to store conditional calculation record information in which a delivery condition set at a time of creating an executed delivery plan is in association with calculation time required for creating the executed delivery plan; and
a processor communicatively coupled to the input device, the communication device, and the memory, wherein the processor is configured to:
acquire a delivery change request,
calculate, based on a delivery time range contained in the delivery change request, a change instruction deadline representing a deadline capable of instructing a change in a delivery plan,
select a delivery condition set similar to the delivery change request from the conditional calculation record information,
calculate a calculation starting time point by counting the calculation time in association with the selected delivery condition set backward from the change instruction deadline,
execute calculation for creating a delivery plan satisfying the delivery change request when a current time point reaches the calculation starting time point,
generate an instruction screen that displays a time axis including at least the calculation starting time point, the change instruction deadline, and a current time point,
select a plurality of delivery condition sets similar to the delivery change request from the conditional calculation record information,
calculate a plurality of calculation starting time points by counting the calculation time in association with each of the plurality of selected delivery condition sets backward from the change instruction deadline,
generate an instruction screen in which the plurality of calculation starting time points are displayed as options and are selected by a user,
update the instruction screen based on one of the options selected by the user,
on a condition that none of the options are selected by the user, periodically update the options available to the user on the instruction screen, wait a predetermined amount of time, select one of the options, and update the instruction screen based on the one of the options selected, and
execute calculation for creating a delivery plan satisfying the delivery change request when a current time point reaches a calculation starting time point selected by the user or the processor.

2. The delivery plan creating device according to claim 1, wherein the processor is further configured to:
acquire a latest delivery status corresponding to the calculated calculation starting time point, and
execute the calculation based on the latest delivery status.

3. The delivery plan creating device according to claim 1, wherein
the memory stores delivery change business information in which time required for a series of supplementary businesses generated with occurrence of a delivery change is recorded, and
the processor calculates the change instruction deadline by counting the time required for the series of supplementary businesses backward from an end time point of the delivery time range contained in the delivery change request with reference to the delivery change business information.

4. The delivery plan creating device according to claim 1, wherein
the instruction screen is configured to display the delivery plan calculated.

5. The delivery plan creating device according to claim 1, wherein
the processor deletes, from the instruction screen, an option of the calculation starting time points that is before a current time point due to passage of time.

6. The delivery plan creating device according to claim 1, wherein
when only one option remains in the instruction screen due to passage of time and a calculation starting time point corresponding to the remaining option is reached, the processor executes calculation for creating a delivery plan satisfying the delivery change request.

7. A delivery plan creating method executed by a delivery plan creating device, the method comprising:
acquiring a delivery change request;
calculating, based on a delivery time range contained in the delivery change request, a change instruction deadline representing a deadline capable of instructing a change in a delivery plan;
selecting, from conditional calculation record information in which a delivery condition set at a time of creating an executed delivery plan is in association with calculation time required for creating the executed delivery plan, a delivery condition set similar to the delivery change request;
calculating a calculation starting time point by counting the calculation time in association with the selected delivery condition set backward from the change instruction deadline;
executing a calculation for creating a delivery plan satisfying the delivery change request when a current time point reaches the calculation starting time point,
generating an instruction screen that displays a time axis including at least the calculation starting time point, the change instruction deadline, and a current time point,
selecting a plurality of delivery condition sets similar to the delivery change request from the conditional calculation record information,
calculating a plurality of calculation starting time points by counting the calculation time in association with each of the plurality of selected delivery condition sets backward from the change instruction deadline, generating an instruction screen in which the plurality of calculation starting time points are displayed as options and are selected by a user, updating the instruction screen based on one of the options selected by the user, on a condition that none of the options are selected by the user, periodically updating the options available to the user on the instruction screen, waiting a predetermined amount of time, selecting one of the options, and updating the instruction screen based on the one of the options selected, and executing a calculation for creating a delivery plan satisfying the delivery change request when a current time point reaches a calculation starting time point selected by the user or the processor.

8. The delivery plan creating device according to claim 1, wherein the processor is further configured to:

acquire a latest delivery status, dynamically updates the delivery plan based on the latest delivery status, and display on the instruction screen an updated delivery plan.

9. The method according to claim 7, further comprising:

acquiring a latest delivery status, dynamically updating the delivery plan based on the latest delivery status, and displaying on the instruction screen an updated delivery plan.

\* \* \* \* \*